United States Patent [19]

Krueger

[11] 3,756,109

[45] Sept. 4, 1973

[54] AUTOMATIC FEED APPARATUS FOR ENCAPSULATED SEMICONDUCTOR UNITS

[75] Inventor: John K. Krueger, Phoenix, Ariz.

[73] Assignee: Motorola, Inc., Franklin Park, Ill.

[22] Filed: July 1, 1971

[21] Appl. No.: 158,819

[52] U.S. Cl. ........................ 83/255, 83/278, 83/404, 83/409, 83/423, 83/914, 198/19

[51] Int. Cl. ................................................ B26d 7/06

[58] Field of Search ........................ 83/255, 404, 405, 83/914, 278, 401, 423, 276, 406, 418, 727, 237, 409; 198/19

[56] References Cited

UNITED STATES PATENTS

| | | | |
|---|---|---|---|
| 2,040,023 | 5/1936 | Reiners et al. | 198/19 |
| 2,259,748 | 10/1941 | Hullhorst | 198/19 X |
| 1,504,419 | 8/1924 | Berkley | 83/423 X |
| 3,116,658 | 1/1964 | Baker | 83/278 |
| 3,570,342 | 3/1971 | Mundt | 83/914 |
| 2,906,238 | 9/1959 | Heaton et al. | 198/213 X |
| 3,374,605 | 3/1968 | Satchwell et al. | 53/128 X |
| 3,525,151 | 8/1970 | Pellerin | 29/430 X |

FOREIGN PATENTS OR APPLICATIONS

| | | | |
|---|---|---|---|
| 15,345 | 7/1902 | Great Britain | 83/255 |

*Primary Examiner*—Andrew R. Juhasz
*Assistant Examiner*—James F. Coan
*Attorney*—Vincent Rauner and Henry T. Olsen

[57] ABSTRACT

A helical screw conveyor is provided for moving strips of concatenate semiconductor units past various work stations. The helical screw conveyor is preferably driven by a one revolution clutch so as to move the strips in a step by step manner.

4 Claims, 4 Drawing Figures

INVENTOR:
JOHN K. KRUEGER
BY: Henry T. Olsen
ATTY.

INVENTOR:
JOHN K. KRUEGER
BY: Henry L. Olsen
ATTY.

AUTOMATIC FEED APPARATUS FOR ENCAPSULATED SEMICONDUCTOR UNITS

BACKGROUND OF THE INVENTION

This invention relates to automatic feed apparatus and more particularly to automatic feed apparatus for controlling the movement of concatenate semiconductor units.

In the art of manufacturing semiconductor units, whether of a discrete or an integrated circuit form, it has become common to utilize some form of a lead frame. Such a lead frame is a flat, thin metallic structure usually having an outer severable frame portion and a plurality of metal portions integral with the frame. One of the metal portions usually provides a pad or mounting structure for the semiconductor chip while the other metal portions are intended to be connected, usually by wire bonding, to the chip and extend outwardly from the ultimate package to provide electrical connections to the semiconductor chip. After the chip is mounted on the pad and suitable electrical connections are made to the other leads a suitable package is arranged around the semiconductor chip and then the outer severable frame portion is removed. The outer package may be a unitary plastic encapsulation as disclosed particularly in U.S. Pat. No. 3,444,440. Lead frames of this type are ordinarily utilized in a strip form whereby a plurality of semiconductor units are assembled and encapsulated simultaneously, as shown, for example, in U.S. Pat. No. 3,391,426-Hugo. When the lead frame is utilized in such strip form the unit thereby forms a concatenate series of units which must be moved to and from various work stations for performing the various functions of assembly forming and separation of the units into individual parts.

SUMMARY OF THE INVENTION

It is an object of this invention to provide a feed apparatus for controlling and feeding of concatenate semiconductor units.

It is another object of this invention to provide apparatus for feeding concatenate semiconductor units which feeds and controls the units in a step by step manner past a series of work stations.

A still further object of the invention is to provide an apparatus for feeding concatenate semiconductor units which is economic to produce and to operate.

A further object of the invention is to provide apparatus for feeding concatenate semiconductor units which is readily adaptable to fully automated production of such units.

A feature of the invention is the provision of apparatus for feeding concatenate semiconductor units which units have an indexing notch at the edge thereof which defines a periodic length. The feeding apparatus comprising a helical screw having a pitch equal to the period length of the units being fed and controlled.

THE DRAWINGS

Further objects and advantages of the invention will be understood from the following complete specification and the drawings wherein.

DETAILED DESCRIPTION

Figure 1:
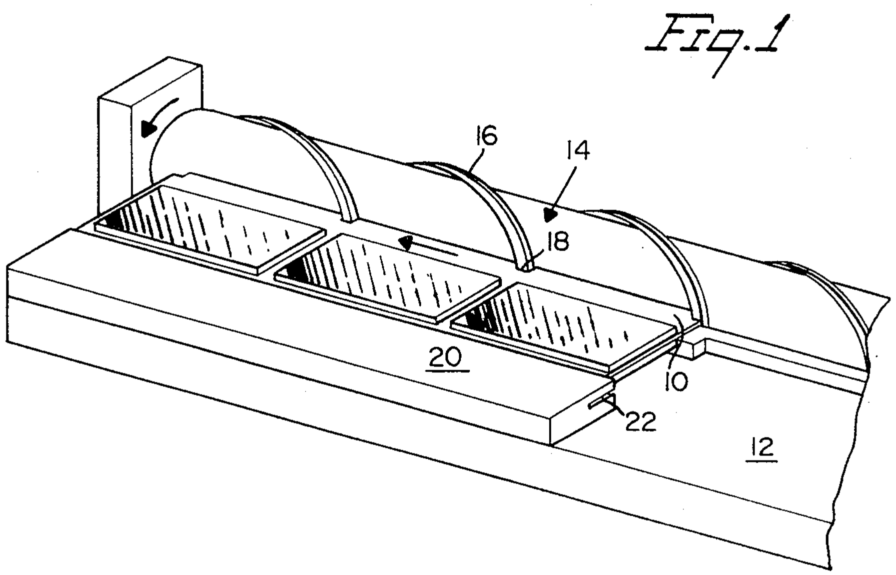
FIG. 1 is a perspective view of the feeding apparatus in accordance with a preferred embodiment of the invention.
Figure 2:
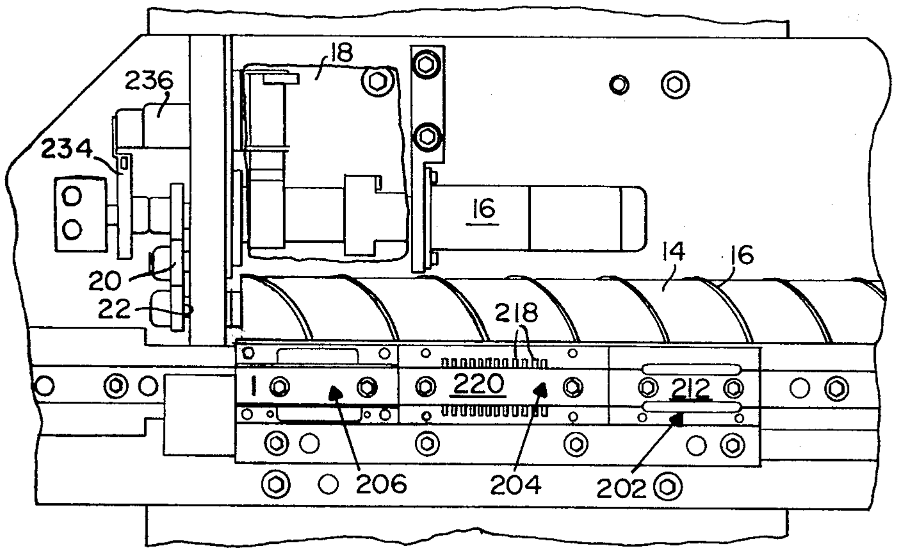
FIG. 2 is a top plan view of the apparatus shown aligned alongside a plurality of work stations.

As somewhat schematically depicted in FIG. 1 in accordance with a preferred embodiment of the invention, concatenate semiconductor units 10 are moved over a support plate 12 by means of a helical screw conveyor 14 by engagement of its rectangular (or round) thread 16 with the index notches 18 in edge of the strip of semiconductor units. The semiconductor units 10 are held in engagement with the screw conveyor 14 by a guide way 20 having a slot 22 therein. Means for rotating the helical screw conveyor 14 include a drive motor 16 which is connected through a one revolution clutch mechanism 18 and suitable gears 20 to the shaft 22 of the helical screw conveyor 14 (FIG. 2).

Figure 4:
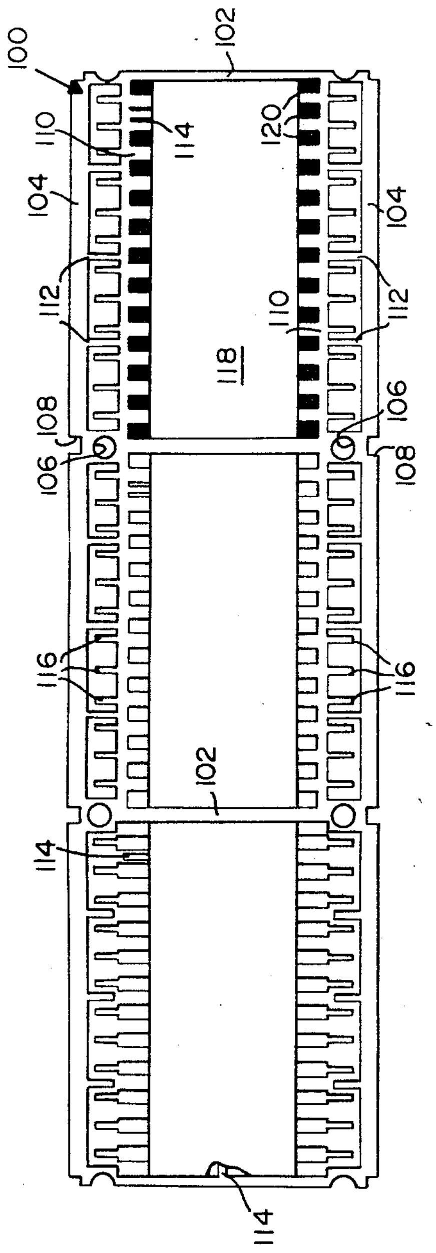
FIG. 4 is a series of concatenate semiconductor units to be fed by the invention disclosed herein.

The concatenate semiconductor units 10 are shown more particularly in FIG. 4. The lead frame of the units is originally stamped out in the form of a flat metal strip 100. The strip comprises a series of cross bars 102 and side bars 104, thus defining a generally rectangular frame for each unit of the strip. Adjacent the ends of each cross bar 102 are a pair of circular indexing holes 106 and a pair of indexing notches 108. While the indexing notches 108 as shown are at the ends of the cross bars it is obvious that they may be placed in any relative position within the side frames of the individual units. The length between the notches defines the periodicity of the strip 100.

Within the generally rectangular frame there is provided a pair of runner bars 110 extending parallel to the side bars 104 and a plurality of support bars 112. Chip support bars 114 support the central pad for the semiconductor chip and a plurality of strips 116 extending generally parallel to the cross bars define the actual lead portions of the package. The strip 100 per se may be formed by etching, punching or the like and it may be composed as a suitably electrically conductive material such as gold plated copper, for example. The inner strips of the leads may be coated for instance with aluminum as a preparatory step to a subsequent bonding operation. The fixed frame work of the leads provided by the clip 100 assures proper lead location and alignment with respect to the integrated circuit.

As aforementioned one of the leads i.e., leads 114 extend through a central portion of the strip 100 and has an enlarged central portion to form a pad for integrated circuit element. The integrated circuit element may be a silicon chip for example including plurality of integrated circuit components and corresponding electrodes. The chip is supported on the pad and then bonded thereto in any appropriate manner and by any suitable bonding technique. Fine aluminum or gold wires or other suitable connectors are bonded to the various electrodes of the chip and to the lead frame.

After a protective or passivation operation the assembly is placed in an appropriate transfer mold. A monolithic molded casing 118 is formed by molding over the passivated surface sensitive elements. During the passivating operation an oxide deposit such as aluminum or silicon may be formed over the elements. The passivation operation can be carried out by a vapor operation by means of which aluminum or silicon is deposited through a mask in accordance with known techniques. The resulting passivation layer on the integrated circuit elements provides compatibility with the encapsulating material and isolates the element therefrom. During the transfer molding operation the edges of the mold clamp down on the cross bars 102 and the runner bars 110 thereby providing mold stops for the edges of the mold cavity. Thus the plastic material not only fills the mold cavity to form the generally rectangular box package or casing 118 as desired but also creates flash 120 in the spaces between the leads of the lead frame.

Figure 3:
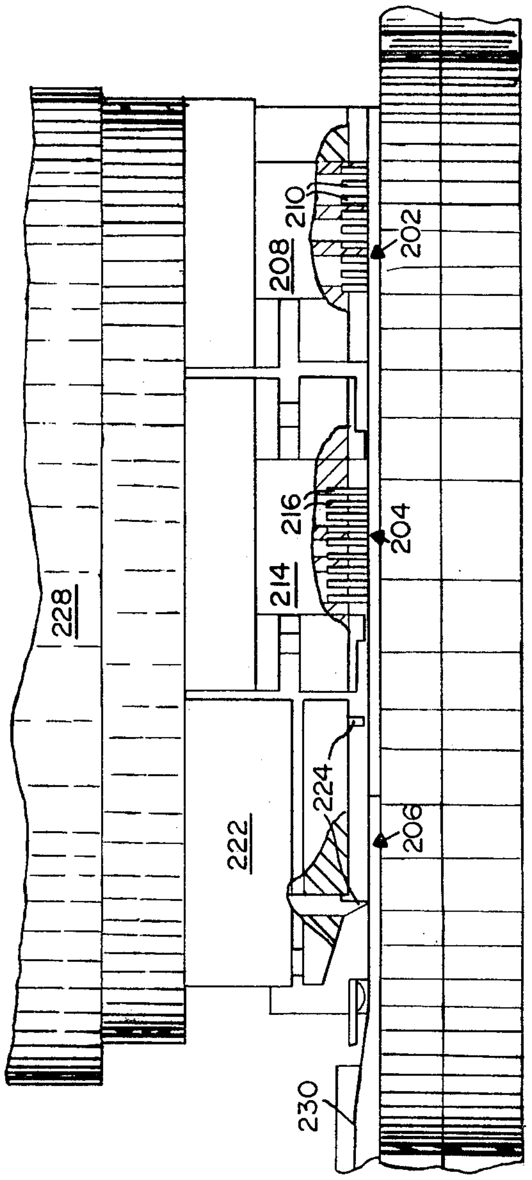
FIG. 3 is a side view partly in section of a plurality of work stations which are to operate on the semiconductor units.

Referring now particularly to FIGS. 2 and 3 the foregoing strip of concatenate units is to be moved past tool pairs defining a plurality of work stations, 202, 204, 206 for respectively: (a) removing the flash 120; (b) removing portions of the runner bars 110 from between leads; and (c) completely removing the semiconductor unit from the strip 100 by cutting the support bars 114 adjacent the casing 118. At the work station 202 the male portion 208 of the tool pair comprises a gang of punches 210. The punches 210 are rectangular in cross section to conform to the flash 120 on the semiconductor units as they come out of the molding press. The female portion 212 of the tool pair of the work station 202 need only have a pair of slots therein to receive the two rows of punches 210, since the flash is relatively brittle and will be removed without bending of the metal portions of the unit.

At the work station 204, the male portion 214 again includes a plurality of punches 216 ganged together which punches cooperate with individual cavities 218 in the female portion 220 of the tool pair. The cross section of the cavities 218 and of the punches 216 is designed to be rectangular to correspond to those portions of the runner bars 110 which extend between the lead portions 116 of the semiconductor units. Moderately close tolerance cooperation between the members of the tool pair is required to remove the portions of the runner bar (as indicated in the left hand portion of FIG. 4), without bending of the leads 116, which form a part of the finished unit.

At the work station 206 the tool 222 has a pair of shearing punches to cut the ends of support bar 114 adjacent the plastic casing 118. As shown each of the tool pairs 208, 214 and 222 are mounted to the ram 228 of a single punch press so that as the concatenate units are indexed past each work station they are operated on progressively with each fall of the punch press. If desired, of course, each of the tool pairs could be mounted on synchronously operated individual presses rather than a single press. As the strip is indexed past the work station 206 and beyond the press area a guide way 230 cams the residual metal strip above the individual semiconductor units so that they become separated for further handling. The press unit 228 is timed with the operation of a single revolution of the screw conveyor 14 by a cam 234 which cooperates with a relay 236, the cam 234 being on a shaft connected with the gears 20 (FIG. 2). Similarly, the operation of the motor 16 is controlled by a relay (not shown) operated by the upstroke of the press to start the next sequence of operations.

While the invention has been disclosed by way of the preferred embodiment thereof it will be appreciated by one skilled in the art that suitable modifications may be made therein without departing from the spirit and scope of the invention.

What is claimed is:

1. Apparatus for manufacturing semiconductor units comprising a plurality of work stations for performing manufacturing operations upon a concatenation of semiconductor units each of which have an index notch at an edge thereof defining a periodic length for the units; and means for feeding said units past said work stations by engagement with said notch including a helical screw directly engaging said notch and having a pitch equal to said periodic length of the units and means for rotating said helical screw.

2. Apparatus as defined in claim 1 wherein said means for rotating said helical screw comprises a one revolution clutch.

3. Apparatus as defined in claim 1 wherein said work stations are mounted on a punch press and each of said work stations is a tool pair for performing progressive punching operations upon portions of said semiconductor units.

4. Apparatus as defined in claim 3 wherein said concatenation of semiconductor units comprise a plastic encapsulated integrated circuit unit having a lead frame and plastic encapsulating flash material to be removed; and wherein a first work station comprises punch means for removing the flash from said lead frame, a second station comprises punch means for removing intermediate portions of said lead frame and a third work station comprises a shearing punch for cutting support means which retains the plastic encapsulated unit within the lead frame thereby removing the latter.

* * * * *